United States Patent
Ramsey et al.

(10) Patent No.: US 7,689,454 B2
(45) Date of Patent: Mar. 30, 2010

(54) DYNAMIC SELECTION OF GROUPS OF OUTBOUND MARKETING EVENTS

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/121,234

(22) Filed: May 3, 2005

(65) Prior Publication Data
US 2006/0253315 A1  Nov. 9, 2006

(51) Int. Cl.
G06F 17/30  (2006.01)

(52) U.S. Cl. ............................... 705/10; 705/8; 705/26; 707/1; 707/100

(58) Field of Classification Search .................. None
See application file for complete search history.

(56) References Cited

U.S. PATENT DOCUMENTS

| | | | | |
|---|---|---|---|---|
| 5,930,764 | A * | 7/1999 | Melchione et al. | 705/10 |
| 5,966,695 | A * | 10/1999 | Melchione et al. | 705/10 |
| 6,236,977 | B1 * | 5/2001 | Verba et al. | 705/10 |
| 6,484,163 | B1 | 11/2002 | Lawrence et al. | |
| 6,567,786 | B1 | 5/2003 | Bibelnieks et al. | |
| 6,847,934 | B1 * | 1/2005 | Lin et al. | 705/10 |
| 6,882,985 | B1 * | 4/2005 | Kay et al. | 705/37 |
| 6,925,441 | B1 * | 8/2005 | Jones et al. | 705/10 |
| 7,007,088 | B1 * | 2/2006 | Najmi | 709/225 |
| 7,133,834 | B1 * | 11/2006 | Abelow | 705/10 |
| 7,194,448 | B2 * | 3/2007 | Luth et al. | 707/1 |
| 7,216,109 | B1 * | 5/2007 | Donner | 705/64 |
| 7,222,078 | B2 * | 5/2007 | Abelow | 705/1 |
| 7,280,975 | B1 * | 10/2007 | Donner | 705/10 |

(Continued)

FOREIGN PATENT DOCUMENTS

WO  WO 9922328  6/1999

(Continued)

OTHER PUBLICATIONS

Peter R Dickson, Paul W Farris, & Willem J M I Verbeke. (2001). Dynamic strategic thinking. Academy of Marketing Science. Journal, 29(3), 216-237.*

(Continued)

*Primary Examiner*—Bradley B Bayat
*Assistant Examiner*—Gurkanwaljit Singh
(74) *Attorney, Agent, or Firm*—Schmeiser, Olsen & Watts; Anna Linne

(57) ABSTRACT

A database system and method for ordering marketing events for offering to candidates. The database system comprises a first database structure storing a first list identifying marketing events, a second database structure storing a second list of candidates, and a database manager software application stored on a computer readable medium. The database manager software application comprises a grouping tool and an optimization tool. The marketing events from the first list are divided into a first plurality of groups. The grouping tool is for dividing candidates from the second list into a second plurality of groups and matching a first group from first plurality of groups with a second group from the second plurality of groups. The optimization tool is for optimizing and sorting the marketing events from the first group for all candidates from the second group.

31 Claims, 3 Drawing Sheets

U.S. PATENT DOCUMENTS

| | | | |
|---|---|---|---|
| 7,364,068 B1* | 4/2008 | Strubbe et al. | 235/376 |
| 7,386,517 B1* | 6/2008 | Donner | 705/75 |
| 2001/0037212 A1* | 11/2001 | Motosuna et al. | 705/1 |
| 2002/0026356 A1* | 2/2002 | Bergh et al. | 705/14 |
| 2002/0040352 A1* | 4/2002 | McCormick | 705/80 |
| 2002/0165771 A1* | 11/2002 | Walker et al. | 705/14 |
| 2003/0083936 A1* | 5/2003 | Mueller et al. | 705/14 |
| 2003/0084053 A1* | 5/2003 | Govrin et al. | 707/100 |
| 2003/0120584 A1 | 6/2003 | Zarefoss et al. | |
| 2003/0140282 A1 | 7/2003 | Kaler | |
| 2003/0208402 A1* | 11/2003 | Bibelnieks et al. | 705/14 |
| 2003/1208402 | 11/2003 | Bibelnieks et al. | |
| 2003/0229536 A1* | 12/2003 | House et al. | 705/10 |
| 2004/0073496 A1 | 4/2004 | Cohen | |
| 2004/0078273 A1* | 4/2004 | Loeb et al. | 705/26 |
| 2004/0093296 A1* | 5/2004 | Phelan et al. | 705/36 |
| 2004/0103017 A1* | 5/2004 | Reed et al. | 705/10 |
| 2004/0103051 A1* | 5/2004 | Reed et al. | 705/36 |
| 2005/0038893 A1* | 2/2005 | Graham | 709/228 |
| 2005/0055275 A1* | 3/2005 | Newman et al. | 705/14 |
| 2005/0071223 A1* | 3/2005 | Jain et al. | 705/14 |
| 2005/0096950 A1* | 5/2005 | Caplan et al. | 705/7 |
| 2005/0137939 A1* | 6/2005 | Calabria et al. | 705/26 |
| 2005/0144065 A1* | 6/2005 | Calabria et al. | 705/14 |
| 2005/0153317 A1* | 7/2005 | DeNise et al. | 435/6 |
| 2005/0154630 A1* | 7/2005 | Lin et al. | 705/10 |
| 2005/0222906 A1* | 10/2005 | Chen | 705/14 |
| 2006/0047563 A1* | 3/2006 | Wardell | 705/10 |
| 2006/0161474 A1* | 7/2006 | Diamond et al. | 705/14 |
| 2006/0247973 A1* | 11/2006 | Mueller et al. | 705/14 |

FOREIGN PATENT DOCUMENTS

| | | | |
|---|---|---|---|
| WO | WO 03093930 A2 | 11/2003 | |

OTHER PUBLICATIONS

Drury Jenkins. (Aug. 1999). Customer relationship management and the data warehouse. Call Center Solutions, 18(2), 88-92.*

Marla Royne Stafford. (2005). International Services Advertising (ISA): Defining the Domain and Reviewing the Literature. Journal of Advertising, 34(1), 65-86.*

Woodside, Arch G. "Modeling Linkage-Advertising: Going Beyond Better Media Comparisons" Journal of Advertising Research; Jul./Aug. 1994, vol. 34 Issue 4, p. 22-31, 10p.*

Shaun Doyle. (2005). Real-time technologies in marketing—Interaction management. Journal of Database Marketing & Customer Strategy Management, 12(3), 272-278.*

Honomichl 50: 1998 Business Report on the Marketing Research Industry. (Jun. 1998).*

Steven Stern, & Douglas Barton. (1997). Putting the "custom" in customer with database marketing. Strategy & Leadership, 25(3), 46-50.*

Portuese, Daniela (2006). E-commerce and the Internet: A study on the impact of relationship marketing opportunities for better online consumer intentional relationship. Ph.D. dissertation, Capella University, United States—Minnesota.*

"A database approach to cross selling in the banking industry: Practices, Strategies, and Challenges." Kin-nam Lau; Haily Chow; Connie Liu; Journal of Database Marketing & Customer Strategy Management; Apr. 2004; 11, 3; ABI/INFORM Global p. 216.*

"Adoption of Internet Banking Among Sophisticated Consumer Segments in an Advanced Developing Country" Serkan Akinci; Safak Aksoy; Eda Atilgan; The International Journal of Bank Marketing; 2004; 22, 2/3; ABI/INFORM Global; p. 212.*

"Interest and reaction time analysis of credit card offers: Managerial implication of High Level Research Procedures" Howard Moskowitz; Dorit Cohen; Bert Krieger; Samuel Rabino; Journal of Financial Services Marketing; Dec. 2001; 6, 2; ABI/INFORM Global; p. 172.*

"The customer industry" Gordon A Wyner; Marketing Management; Jan./Feb. 2002; 11, 1; ABI/INFORM Global; p. 6.*

* cited by examiner

DYNAMIC SELECTION OF GROUPS OF OUTBOUND MARKETING EVENTS

BACKGROUND OF THE INVENTION

1. Technical Field

The present invention relates to a system and associated method for ordering outbound marketing events for offering to groups of candidates.

2. Related Art

Selling a plurality of services to customers typically requires a complicated series of steps. Therefore there exists a need for a simple procedure to sell a plurality of services to customers.

SUMMARY OF THE INVENTION

The present invention provides database system, comprising:

a first database structure storing a first list identifying marketing events, wherein each marketing event from said first list comprises a marketing offer and an identified channel means for communicating said marketing offer, and wherein said marketing events from said first list are divided into a first plurality of groups;

a second database structure storing a second list of candidates; and a database manager software application stored on a computer readable medium, wherein said database manager software application comprises a grouping tool and an optimization tool, wherein said grouping tool is for dividing candidates from said second list of candidates into a second plurality of groups and matching a first group from said first plurality of groups with a second group from said second plurality of groups, wherein candidates from said second group comprise a first specified candidate trait, and wherein said optimization tool is for optimizing and sorting, said marketing events from said first group for all candidates from said second group.

The present invention provides a selection method, comprising:

providing a database system comprising a first database structure storing a first list identifying marketing events, a second database structure storing a second list of candidates, and a database manager software application stored on a computer readable medium, wherein said database manager software application comprises a grouping tool and an optimization tool, wherein each marketing event from said first list comprises a marketing offer and an identified channel means for communicating said marketing offer, and wherein said marketing events from said first list are divided into a first plurality of groups;

dividing by said grouping tool, candidates from said second list of candidates into a second plurality of groups;

matching by said grouping tool, a first group from said first plurality of groups with a second group from said second plurality of groups, wherein all candidates from said second group comprise a first specified candidate trait;

optimizing, by said optimization tool, said marketing events from said first group for all of said candidates from said second group; and sorting, by said optimization tool, said marketing events from said first group for all of said candidates from said second group.

The present invention provides a process for integrating computing infrastructure, comprising integrating computer-readable code into a computing system, wherein the code in combination with the computing system comprises a database system comprising a first database structure storing a first list identifying marketing events, a second database structure storing a second list of candidates, and a database manager software application stored on a computer readable medium, wherein said database manager software application comprises a grouping tool and an optimization tool, wherein each marketing event from said first list comprises a marketing offer and an identified channel means for communicating said marketing offer, wherein said marketing events from said first list are divided into a first plurality of groups, and wherein the code in combination with the computing system is adapted to implement a method for performing the steps of:

dividing by said grouping tool, candidates from said second list of candidates into a second plurality of groups;

matching by said grouping tool, a first group from said first plurality of groups with a second group from said second plurality of groups, wherein all candidates from said second group comprise a first specified candidate trait;

optimizing, by said optimization tool, said marketing events from said first group for all of said candidates from said second group; and sorting, by said optimization tool, said marketing events from said first group for all of said candidates from said second group.

The present invention provides computer program product, comprising a computer usable medium having a computer readable program code embodied therein, said computer readable program code comprising an algorithm adapted to implement a method for ordering a first list identifying of marketing events within a database system, said database system comprising a database system comprising a first database structure storing said first list identifying marketing events, a second database structure storing a second list of candidates, and a database manager software application stored on a computer readable medium, wherein said database manager software application comprises a grouping tool and an optimization tool, wherein each marketing event from said first list comprises a marketing offer and an identified channel means for communicating said marketing offer, wherein said marketing events from said first list are divided into a first plurality of groups, said method comprising the steps of:

dividing by said grouping tool, candidates from said second list of candidates into a second plurality of groups;

matching by said grouping tool, a first group from said first plurality of groups with a second group from said second plurality of groups, wherein all candidates from said second group comprise a first specified candidate trait;

optimizing, by said optimization tool, said marketing events from said first group for all of said candidates from said second group; and sorting, by said optimization tool, said marketing events from said first group for all of said candidates from said second group.

The present invention advantageously provides a system and associated method to implement a simple procedure to sell a plurality of services to customers.

DETAILED DESCRIPTION OF THE INVENTION

Figure 1:
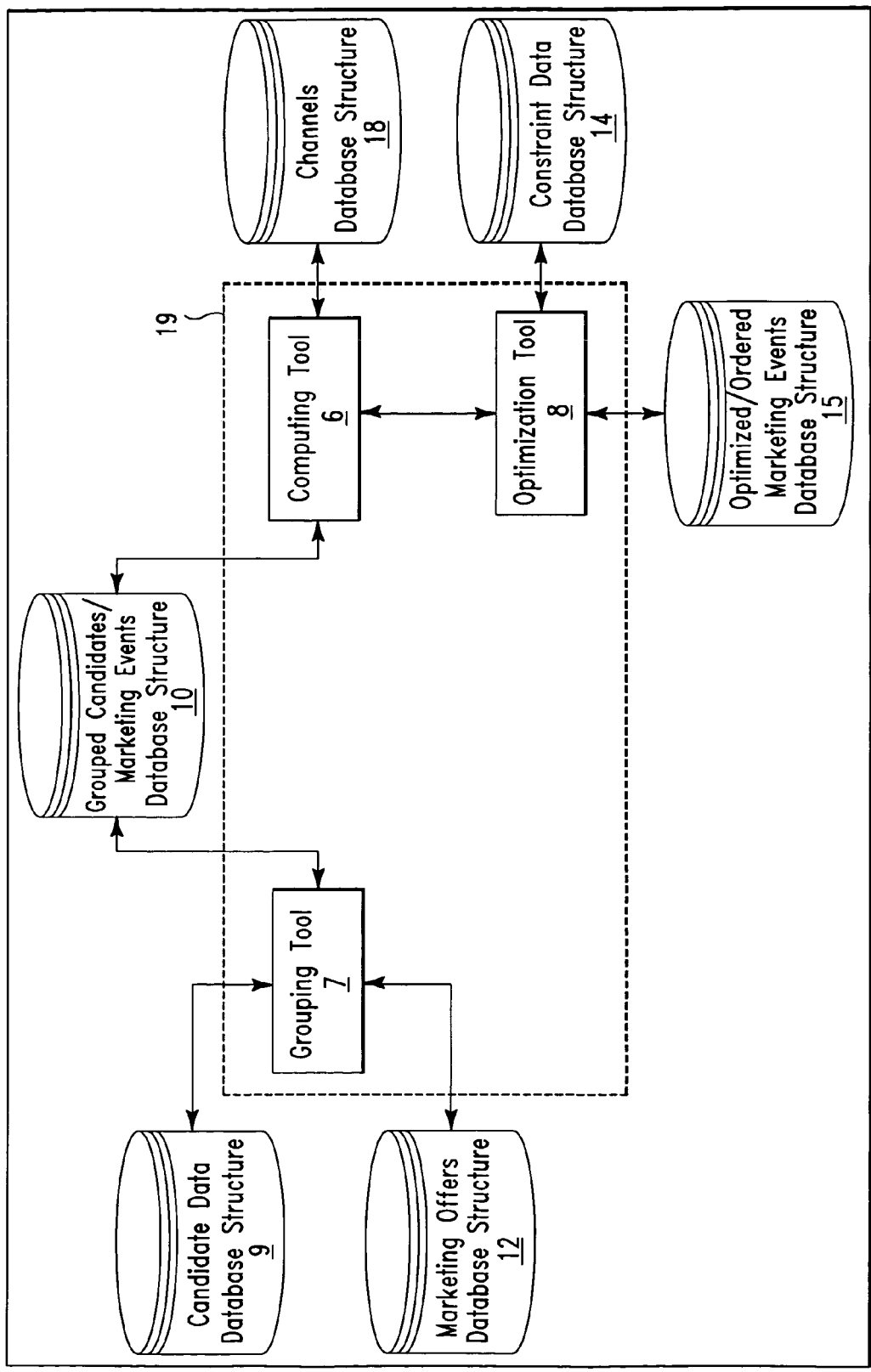
FIG. 1 illustrates a block diagram view of a database system for dynamically ordering a plurality of marketing events for offering to groups of candidates, in accordance with embodiments of the present invention.

FIG. 1 illustrates a block diagram view of a database system 2 for dynamically ordering a list identifying a plurality of marketing events for offering marketing offers to a group of candidates, in accordance with embodiments of the present invention. Each marketing event comprises a marketing offer and an identified channel means for communicating the marketing offers to a candidate. For example, a marketing event may comprise a 1.9% APR introductory interest rate for a 12 month period on a credit card, delivered to the candidate through direct mail. A marketing event may either comprise a growth (new marketing offer) marketing event or a retention (existing product like an existing credit card to be retained) marketing event. A marketing offer is defined herein as an offer from an entity (e.g., a business) for a product or service to be extended to a customer or potential customer (i.e., candidate). The product or service may comprise an incentive to entice the customer or potential customer to accept the offer. For example, the marketing offer may comprise a credit card offer that will provide an APR that is lower than the normal for a specified period of time as an incentive, such as, inter alia, 1.9% APR for the first 12 months if the credit card is accepted. A candidate may be an existing customer of the entity and a potential customer for the marketing offer. For example, an individual, a business, etc. A channel is a means to contact the candidate. For example, e-mail, direct mail, text message, telephone, etc. An outbound marketing event comprises a marketing event where an initial contact is made by an entity to offer the marketing event to a candidate. The database system 2 is used by an entity (e.g., a business such as a bank) comprising an existing customer database to sequentially order and optimize outbound marketing events (herein referred to marketing events) for offering to groups of candidates from the existing customer database. The database system 2 comprises database structures 9, 10, 12, 14, 15, and 18, and a database manager software application 19. The database manager software application 19 is a single database manager software application (i.e., one software application as opposed to multiple software applications) comprising multiple software components. The database manager software application 19 may comprise any type of database management software application including, inter alia, DB2 database management system by IBM, etc. The database manager software application 19 comprises a computing tool 6 and an optimization tool 8 (i.e., software components). Using a single database manager software application (i.e., database manager software application 19) comprising multiple software components (i.e., grouping tool 7, computing tool 6 and optimization tool 8) is advantageous over using a plurality of individual database manager software applications (e.g., a first individual database manager software application comprising a computing tool, a second individual database manager software application comprising an optimization tool, and a third individual database manager software application comprising a grouping tool) because communications between components of a single database manager software application (e.g., grouping tool, 7, computing tool 6, optimization tool 8, etc.) are faster and more efficient than communications between multiple individual database manager software applications. Communications between components of a single database manager software application are faster and more efficient than communications between multiple individual database manager software applications because data (for manipulation) only has to be moved within a single software application and does not have to be moved from one software application to another software application. Therefore functions performed on the data (e.g., calculations, optimizations, etc) are performed faster and more efficiently by a single database manager software application than by multiple database manager software applications. Each of database structures 9, 10, 12, 14, 15, and 18 may be individual database structures within the database system 2. Alternatively, each of database structures 9, 10, 12, 14, 15, and 18 may be tables or sections within a single database system (e.g., as illustrated in FIG. 1). Database structure 9 comprises customer (i.e., candidate) data including, inter alia, a list of candidates, data models using any customer past history data (e.g., credit card balances, past spending habits, etc.), etc. The customer (i.e., candidate) data comprises information about all of the entity's customers, current or prospective. This data may be compiled from any standard source including, inter alia, an existing marketing database containing data regarding active customers of the entity. The customer data primarily comprises candidate traits for each candidate, behavioral data (e.g., purchasing history, returned-items history, payment history, etc), promotional (i.e., marketing events) history (e.g., past marketing events offered to a candidate including information regarding which marketing events were accepted by the candidate), and demographic data regarding the candidate. A candidate trait is defined herein as a type of characteristic that a candidate comprises. For example a candidate trait may comprise, inter alia, a candidate income range (e.g., low income, high income, etc.), a geographical location, an age group, a credit rating, etc. Database structure 9 additionally comprises a predetermined total budget for each candidate regarding an amount of money that the entity offering the marketing events is willing to spend to offer a plurality of marketing events to the candidate. Database structure 12 comprises the marketing offers. Database structure 12 additionally comprises a predetermined value score associated with each marketing offer. A value score is a numerical score (e.g., in dollars) representing an expected profit gain to be produced by a marketing offer from a candidate accepting and executing the marketing offer. The marketing offers are placed in groups according to a specific candidate trait. For example, a first group of marketing offers may be grouped for offering to candidates from a specific geographical location and a second group of marketing offers may be grouped for offering to candidates with a specific credit rating, etc. Database structure 12 additionally comprises drop date data for each of the marketing offers and/or groups of marketing offers. A drop date is an origin date for offering the marketing offers. Database structure 14 comprises constraint data regarding the marketing offer(s) as applied to the groups of candidates. Constraint data is defined herein as constraints that are associated with offering a marketing offer to a candidate. For example, constraint data may include, inter alia, an amount of money regarding execution costs for offering the marketing offer to a candidate(s) (i.e., an amount that the entity has determined that they are willing is to spend to offer the marketing event to the candidate(s)), a maximum number of offerings for a marketing event (e.g., how many times a marketing event is offered to a candidate), timing between offers, etc. Execution costs comprise costs associated with using each of the channels in the channels database structure 18. Execution costs may comprise, inter alia, costs for promotional materials, mailing costs, telemarketing costs, infrastructure costs, etc. Database structure 18 comprises data regarding channels that may be used to communicate the marketing offer to a group of candidates (e.g., e-mail, direct mail, text message, telephone, etc.). The grouping tool 7 divides candidates from the list of candidates in the database structure 9 into groups. Each group of candidates is grouped by association with a specific candidate trait. The grouping tool 7 then matches each group of candidates with an associated group of marketing offers associated with a same specific candidate trait. The matched groups of candidates and marketing offers are placed in the database structure 10. The computing tool 6 applies the data from database structure 18 to the matched groups of candidates and marketing offers from database structure 10 to create a plurality of matched groups of candidates and marketing events. The computing tool 6 uses data supplied from the database structures 9 10, and 12 to compute response probability scores and ranking scores for each of the marketing events within a group with respect to each associated group of candidates. The response probability scores are for determining a probability that candidates within a group will respond to each of the marketing events. In other words, the response probability scores determine a probability that each candidate within a group will respond to and accept a marketing event within a specified time frame. The ranking score is computed as a function of a value score with respect to a response probability score (e.g., by multiplying a value score for a marketing event with a response probability score for a group of candidates). Each ranking score is associated with a marketing event within a group for candidates within an associated group. The ranking scores are used to order the marketing events (e.g., from highest rank to lowest rank) to determine an order in which to offer the plurality of marketing events to the associated group of candidates. The optimization tool 8 sorts the ranking scores (i.e., for the marketing events) from highest rank to lowest rank for a group of candidates and a ranking list is created. The optimization tool 8 uses data from the database structure 14 to apply constraint data (e.g., timing constraints, budget constraints, etc.) to each of the ranking scores on the ranking list for the group of candidates. The optimization tool 8 applies timing constraints to each of the ranking scores for each of the marketing events within a group. The timing constraints eliminate any marketing events that comprise timing conflicts between marketing events. For example, the optimization tool 8 will take the highest ranked marketing event (first marketing event) and compare it to the next highest ranked marketing event (second marketing event). If the two marketing events comprise a same type of marketing event (e.g., both marketing events comprise a credit card offer), then the optimization tool looks for a timing conflict. For example if the first marketing event is to be offered to a group of candidates every 30 days and the second marketing event is to be offered every 30 days then the second marketing event is eliminated from the ranking list because the two marketing events are same type of marketing event and should not be received by the group of candidates at the same time. The optimization tool 8 will continue to apply the timing constraints to each of the marketing events on the ranking list. Marketing events comprising timing conflicts are eliminated from the ranking list. The optimization tool 8 then applies monetary (i.e., budget) constraints to the value scores that remain on the ranking list and subtracts the monetary constraints from the predetermined budgeted execution costs for offering the marketing event to the group of candidates. The predetermined budgeted amount comprises an amount of money for execution costs that the entity has determined that they are willing to spend to offer a plurality of marketing events to the group of candidates. For example, each time a marketing event is offered to a group of candidates, the execution costs are deducted from the budgeted amount, and once the budget is exceeded, the optimization tool 8 will eliminate any remaining marketing events from the ranking list. The final ranking list comprises marketing events that have not been eliminated and a specified order for offering the marketing events to the associated group of candidates. The final ranking list is stored in the database structure 15.

Table 1 illustrates an example of sorted ranking scores with constraint data applied and subtracted from the budget.

TABLE 1

| Ranking score | Constraint data | Budget |
|---|---|---|
| $50 | $10 | $30 |
| $40 | $ 5 | $20 |
| $30 | $10 | $15 |
| $20 | $ 5 | $ 5 |
| $10 | $10 | $ 0 |

The first row comprises the highest ranked marketing event ($50 rank). The total budget is $30 and the associated constraint data is $10. The constraint data ($10) is subtracted from the budget ($30) for the highest ranked marketing event leaving $20 in the budget for offering more marketing events to the group of candidates. The second row comprises the next ranked marketing event ($40 rank). The constraint data ($5) is subtracted from the budget ($20) for the next ranked marketing event ($40 rank) leaving $15 in the budget offering more marketing events to the group of candidates. The optimization tool goes through each ranked marketing event until there is no more money left in the budget (see row 5) thereby eliminating any more offerings for marketing events. The first four rows comprise the marketing events to be offered sequentially to the candidate. The fifth row comprises an eliminated marketing event due to an exhausted budget ($0).

An example of an implementation for the database system 2 of FIG. 1 for dynamically ordering marketing events for a group of candidates is described as follows. This example comprises six marketing offers and four channels.

Marketing Offers

1. A Mortgage Offer

2. A Credit Card offer

3. A Household insurance offer

4. An Auto insurance offer

5. A Platinum Credit Card

6. A low rate loan offer

Channels

1. Mail

2. Email

3. Outbound telephone call

4. Text message

The 6 marketing offers are multiplied by the 4 channels to produce 24 marketing events. Each marketing event comprises a drop date and therefore a calendar of events. A first group of candidates is scored for each of the 24 marketing events with propensity to respond (i.e., a response probability score) to each of the marketing events. All 24 response probability scores are calculated in parallel and each score comprises a range between 0 and 1 with 1 comprising the highest propensity to respond to a marketing event and 0 comprising the lowest propensity to respond to a marketing event. Each of the marketing events comprises an expected profit gain (i.e., value score). For example, if the marketing offer is a mortgage offer, the expected profit margin (i.e., value score) may be calculated based on an annual return of repayments vs. infrastructure costs balanced against the risk of the candidate defaulting on the mortgage vs. prepayment of mortgage before the term is up (although the mortgage may be loaded with a prepayment penalty clause to protect a revenue stream). A ranking score for each of the 24 marketing events is calculated as a function of a value score with respect to a response probability score for the associated marketing event with respect to the group of candidates (e.g., by multiplying each value score for each marketing event by a response probability score for the associated marketing event with respect to the group of candidates). The aforementioned process is performed by a computing tool (e.g., computing tool 6 in FIG. 1). An optimization tool (e.g., optimization tool 8 in FIG. 1) sorts the 24 marketing events from highest ranking scores to lowest ranking scores. The optimization tool may alternatively sort 24 marketing events in any manner. The optimization tool applies constraint data including timing constraints and monetary constraints (i.e., verses budget) to the 24 marketing events. The constraint data is applied to the 24 marketing events starting with the highest ranked marketing event to the lowest ranking marketing event and ultimately an optimized execution list is produced comprising a stream of marketing events that the group of candidates will receive. As an alternative, the marketing events may be ordered and optimized for the group of candidates by the optimization tool 8 without using value scores, response probability scores, and ranking scores. Additionally, the marketing events may be ordered and optimized by the optimization tool 8 for the group of candidates using any combination of the value scores, response probability scores, and ranking scores.

Figure 2:
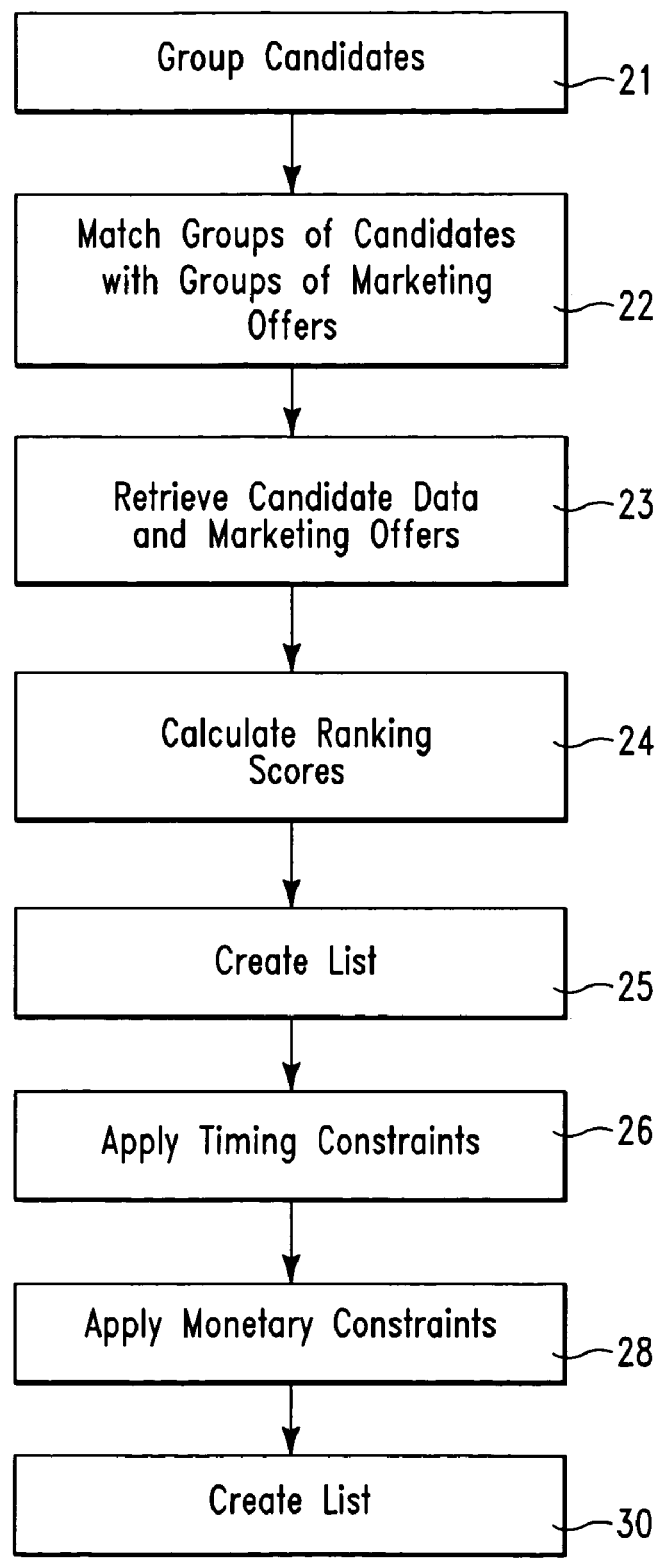
FIG. 2 illustrates a flowchart comprising an algorithm used by database system of FIG. 1 for dynamically ordering a plurality of marketing events for offering to groups of candidates, in accordance with embodiments of the present invention.

FIG. 2 illustrates a flowchart comprising an algorithm used by database system 2 of FIG. 1 for dynamically ordering a plurality of marketing events for offering to a group of candidates, in accordance with embodiments of the present invention. In step 21, the grouping tool 7 places the candidates from a list in groups according to specific candidate traits. In step 22, the grouping tool 7 matches each group of candidates with an associated group of marketing offers associated with a same specific candidate trait. The matched groups of candidates and marketing offers are placed in the database structure 10. In step 23, the computing tool 6 retrieves data from the database structure 10 to compute response probability scores and ranking scores for each of the marketing events within a group with respect to an associated group of candidates. In step 24, ranking scores for each marketing event within the group are calculated by the computing tool 6. In step 25, the optimization tool 8 sorts the ranking scores (i.e., for the marketing events) from highest rank to lowest rank for the group of candidates and a ranking list is created. In step 26, the optimization tool 8 applies timing constraints to each of the ranking scores within the group. The timing constraints eliminate any marketing events that comprise timing conflicts. In step 28, the optimization tool 8 applies monetary constraints to the value scores that remain after the timing constraints have been applied and subtracts the monetary constraints from the predetermined budgeted execution costs for offering the marketing event to the group of candidates. In step 30, a final ranking list is created as a result of execution steps 26 and 28. Note that steps 26 and 28 may be performed in any order. The final ranking list comprises marketing events that have not been eliminated (i.e., by timing and monetary constraints). The final ranking list comprises a specified order for offering the marketing events to the group of candidates. Ranking a plurality of marketing events for the group of candidates may be done in parallel. Additionally, ranking a plurality of marketing events for a plurality of groups of candidates may be done in simultaneously in parallel.

Figure 3:
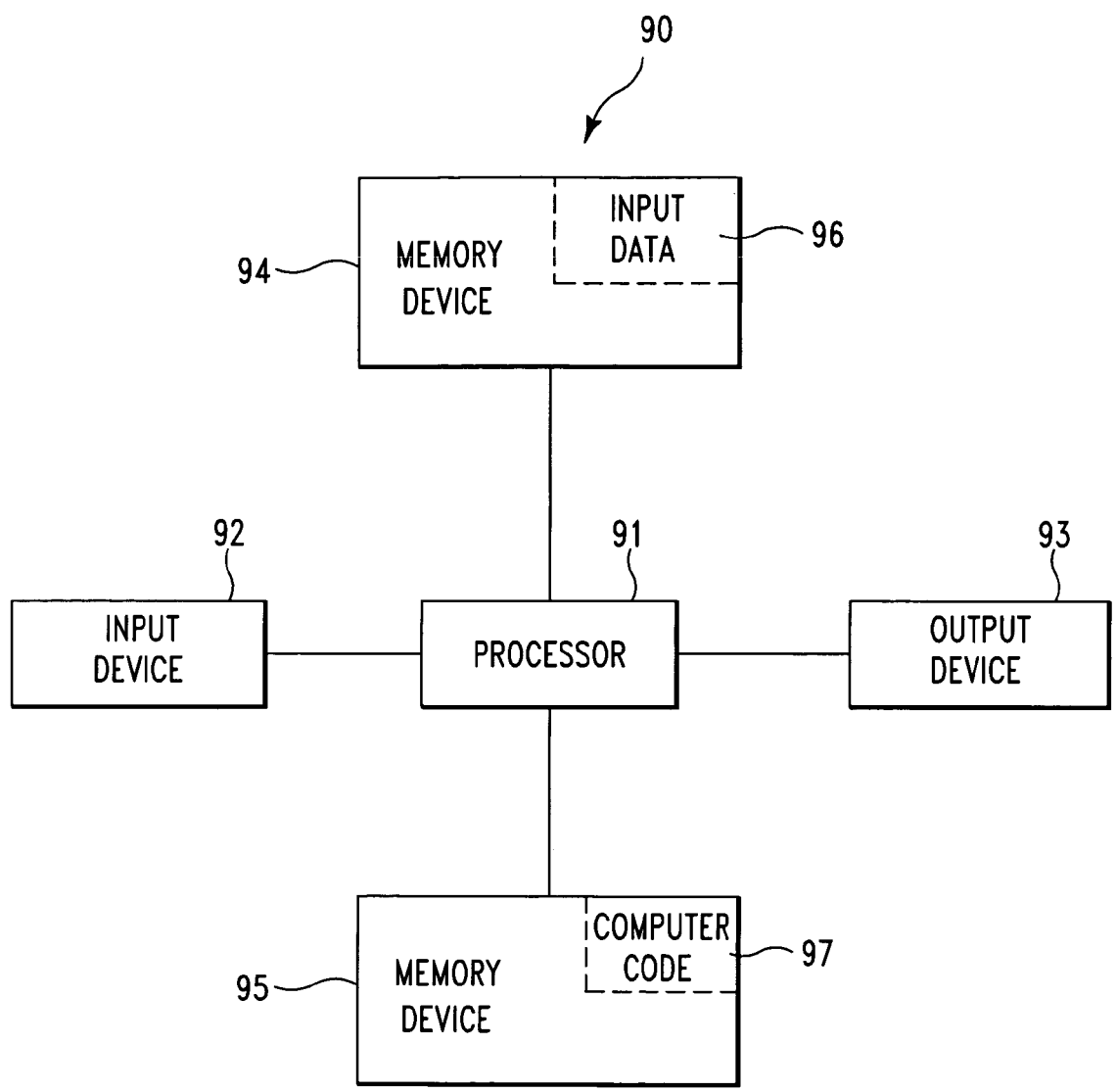
FIG. 3 illustrates a computer system used for implementing the database system for dynamically ordering a plurality of marketing events for offering to groups of candidates, in accordance with embodiments of the present invention.

FIG. 3 illustrates a computer system 90 used for implementing the database system of FIG. 1 for dynamically ordering a plurality of marketing events for offering to a group of candidates, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for dynamically ordering a plurality of marketing events for offering to a group of candidates. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for dynamically ordering a plurality of marketing events for offering to a group of candidates.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A database system comprising a computer processor coupled to a computer-readable memory unit, said database system comprising a first database structure storing a first list identifying marketing events and a third list of value scores, a second database structure storing a second list of candidates, a third database structure storing at least one data model, and a database manager software application stored on a computer readable medium, wherein said database manager software application comprises a grouping tool, a computing tool, and an optimization tool, wherein each marketing event from said first list comprises a marketing offer and an identified channel means for communicating said marketing offer, wherein each value score from said third list is associated with a marketing event from said first list, wherein said value scores are associated with an expected profit gain associated with each said marketing offer, and wherein said marketing events from said first list are divided into a first plurality of groups, said memory unit comprising instructions that when executed by the computer processor implements a method comprising:

applying, by said optimization tool, constraint data to said marketing events, wherein said constraint data comprises first data and second data, wherein said first data consists of an amount of money regarding execution costs for offering said marketing events to a candidate, wherein said second data consists of budgetary data regarding a total budgeted amount allotted for offering all of said marketing events, and wherein said execution costs comprise costs for promotional materials, mailing costs, and telemarketing costs;

receiving, by said computing device, timing constraints associated with offering successive marketing events comprising a same type of marketing offer;

first determining, by said optimization tool in response to said receiving said timing constraints, that said first marketing event of said marketing events comprises a same type of marketing offer as a marketing offer comprised by a second marketing event of said marketing events;

second determining, by said optimization tool in response to said receiving said timing constraints, that a timing conflict exists between offering said first marketing event and offering said second marketing event;

eliminating, by said optimization tool from said first list in response to said first determining and said second determining, said first marketing event;

dividing by said grouping tool, candidates from said second list of candidates into a second plurality of groups;

matching by said grouping tool, a first group from said first plurality of groups with a second group from said second plurality of groups, wherein all candidates from said second group comprise a first specified candidate trait;

computing, by said computing tool, response probability scores for said marketing events from said first group for all of said candidates within said second group, wherein each of said response probability scores are computed using said at least one data model; and computing by said computing tool, a ranking score for each of said marketing events from said first group for all of said candidates from said second group, wherein each of said ranking scores are computed by multiplying a value score from said third list with an associated response probability score of said response probability scores;

optimizing, by said computer processor, said marketing events from said first group for all of said candidates from said second group, said computer processor executing said optimization tool to perform said optimizing; and sorting, by said optimization tool, said marketing events from said first group for all of said candidates from said second group, wherein said marketing events from said first group are optimized and sorted for all of said candidates from said second group by optimizing and sorting said ranking scores for each of said marketing events from said from said first group.

2. The database system of claim 1, wherein said grouping tool is for matching a third group from said first plurality of groups with a fourth group from said second plurality of groups, wherein all candidates from said fourth group comprise a second specified candidate trait, wherein said first specified candidate trait comprises a different candidate trait than said second specified candidate trait, and wherein said optimization tool is for optimizing and sorting, said marketing events from said third group for all candidates from said fourth group.

3. The database system of claim 1, wherein said optimization tool is for generating a priority list comprising said sorted marketing events from said first group, and wherein said priority list prioritizes an order in which to offer each of said marketing events from said first group to all of said candidates from said second group.

4. The selection system of claim 1, wherein said optimization tool is for generating a priority list comprising a first set of marketing events from said sorted marketing events from said first group that fall within a specified set of constraints, and wherein said priority list is for prioritizing an order in which to offer each of said marketing events from said first group to all of said candidates from said second group.

5. The database system of claim 4, wherein said specified set of constraints comprise timing conflicts related to offering all marketing events within said first group.

6. The database system of claim 4, wherein said specified set of constraints comprise budget constraints related to offering all marketing events within said first group.

7. The database system of claim 1, wherein said list of candidates comprises existing customers of an entity that is offering said plurality of marketing events.

8. The database system of claim 1, wherein said marketing events from said first group are sorted and optimized essentially simultaneously.

9. The database system of claim 1, wherein each marketing offer is selected from the group consisting of a product offer and a service offer.

10. The database system of claim 1, wherein each identified channel means is selected from the group consisting of a telephone call, an email, a text message, and standard mail.

11. A selection method, comprising:

providing a database system comprising a first database structure storing a first list identifying marketing events and a third list of value scores, a second database structure storing a second list of candidates, a third database structure storing at least one data model, and a database manager software application stored on a computer readable medium, wherein said database manager software application comprises a grouping tool, a computing tool, and an optimization tool, wherein each marketing event from said first list comprises a marketing offer and an identified channel means for communicating said marketing offer, wherein each value score from said third list is associated with a marketing event from said first list, wherein said value scores are associated with an expected profit gain associated with each said marketing offer, and wherein said marketing events from said first list are divided into a first plurality of groups;

applying, by said optimization tool, constraint data to said marketing events, wherein said constraint data comprises first data and second data, wherein said first data consists of an amount of money regarding execution costs for offering said marketing events to a candidate, wherein said second data consists of budgetary data regarding a total budgeted amount allotted for offering all of said marketing events, and wherein said execution costs comprise costs for promotional materials, mailing costs, and telemarketing costs;

receiving, by said computing device, timing constraints associated with offering successive marketing events comprising a same type of marketing offer;

first determining, by said optimization tool in response to said receiving said timing constraints, that said a first marketing event of said marketing events comprises a same type of marketing offer as a marketing offer comprised by a second marketing event of said marketing events;

second determining, by said optimization tool in response to said receiving said timing constraints, that a timing conflict exists between offering said first marketing event and offering said second marketing event;

eliminating, by said optimization tool from said first list in response to said first determining and said second determining, said first marketing event;

dividing by said grouping tool, candidates from said second list of candidates into a second plurality of groups;

matching by said grouping tool, a first group from said first plurality of groups with a second group from said second plurality of groups, wherein all candidates from said second group comprise a first specified candidate trait;

computing, by said computing tool, response probability scores for said marketing events from said first group for all of said candidates within said second group, wherein each of said response probability scores are computed using said at least one data model; and computing by said computing tool, a ranking score for each of said marketing events from said first group for all of said candidates from said second group, wherein each of said ranking scores are computed by multiplying a value score from said third list with an associated response probability score of said response probability scores;

optimizing, by a computer processor of said database system, said marketing events from said first group for all of said candidates from said second group, said computer processor executing said optimization tool to perform said optimizing; and sorting, by said optimization tool, said marketing events from said first group for all of said candidates from said second group, wherein said marketing events from said first group are optimized and sorted for all of said candidates from said second group by optimizing and sorting said ranking scores for each of said marketing events from said from said first group.

12. The method of claim 11 further comprising:

matching by said grouping tool, a third group from said first plurality of groups with a fourth group from said second plurality of groups, wherein all candidates from said fourth group comprise a second specified candidate trait, wherein said first specified candidate trait comprises a different candidate trait than said second specified candidate trait;

optimizing, by said optimization tool, said marketing events from said third group for all candidates from said fourth group; and sorting, by said optimization tool, said marketing events from said third group for all of said candidates from said fourth group.

13. The method of claim 11, further comprising generating by the optimization tool, a priority list comprising said sorted marketing events from said first group, and wherein said priority list prioritizes an order in which to offer each of said marketing events from said first group to all of said candidates from said second group.

14. The method of claim 11, further comprising generating by the optimization tool, a priority list comprising a first set of marketing events from said sorted marketing events from said first group that fall within a specified set of constraints, and wherein said priority list is for prioritizing an order in which to offer each of said marketing events from said first group to all of said candidates from said second group.

15. The method of claim 14, wherein said specified set of constraints comprise timing conflicts related to offering all of said marketing events from said first group.

16. The database system of claim 14, wherein said specified set of constraints comprise budget constraints related to offering all of said marketing events from said first group.

17. The method of claim 11, wherein said list of candidates comprises existing customers of an entity that is offering said plurality of marketing events.

18. The method of claim 11, wherein said marketing events from said first group are sorted and optimized essentially simultaneously.

19. The method of claim 11, wherein each marketing offer is selected from the group consisting of a product offer and a service offer.

20. The method of claim 11, wherein each identified channel means is selected from the group consisting of a telephone call, an email, a text message, and standard mail.

21. A computer-executable program product comprising computer executable instructions tangibly embodied on a computer readable medium that when executed by said computer perform the method steps comprising an algorithm adapted to implement a method for ordering a first list identifying of marketing events within a database system, said database system comprising a first database structure storing said first list identifying marketing events and a third list of value scores, a second database structure storing a second list of candidates, a third database structure storing at least one data model, and a database manager software application stored on a computer readable medium, wherein said database manager software application comprises a grouping tool, a computing tool, and an optimization tool, wherein each marketing event from said first list comprises a marketing offer and an identified channel means for communicating said marketing offer, wherein each value score from said third list is associated with a marketing event from said first list, wherein said value scores are associated with an expected profit gain associated with each said marketing offer, wherein said marketing events from said first list are divided into a first plurality of groups, said method comprising the steps of:

applying, by said optimization tool, constraint data to said marketing events, wherein said constraint data comprises first data and second data, wherein said first data consists of an amount of money regarding execution costs for offering said marketing events to a candidate, wherein said second data consists of budgetary data regarding a total budgeted amount allotted for offering all of said marketing events, and wherein said execution costs comprise costs for promotional materials, mailing costs, and telemarketing costs;

receiving, by said computing device, timing constraints associated with offering successive marketing events comprising a same type of marketing offer;

first determining, by said optimization tool in response to said receiving said timing constraints, that said first marketing event of said marketing events comprises a same type of marketing offer as a marketing offer comprised by a second marketing event of said marketing events;

second determining, by said optimization tool in response to said receiving said timing constraints, that a timing conflict exists between offering said first marketing event and offering said second marketing event;

eliminating, by said optimization tool from said first list in response to said first determining and said second determining, said first marketing event;

dividing by said grouping tool, candidates from said second list of candidates into a second plurality of groups;

matching by said grouping tool, a first group from said first plurality of groups with a second group from said second plurality of groups, wherein all candidates from said second group comprise a first specified candidate trait;

computing, by said computing tool, response probability scores for said marketing events from said first group for all of said candidates within said second group, wherein each of said response probability scores are computed using said at least one data model; and computing by said computing tool, a ranking score for each of said marketing events from said first group for all of said candidates from said second group, wherein each of said ranking scores are computed by multiplying a value score from said third list with an associated response probability score of said response probability scores;

optimizing, by a computer processor of said database system, said marketing events from said first group for all of said candidates from said second group, said computer processor executing said optimization tool to perform said optimizing; and sorting, by said optimization tool, said marketing events from said first group for all of said candidates from said second group, wherein said marketing events from said first group are optimized and sorted for all of said candidates from said second group by optimizing and sorting said ranking scores for each of said marketing events from said from said first group.

22. The computer program product of claim 21, wherein said method further comprises:

matching by said grouping tool, a third group from said first plurality of groups with a fourth group from said second plurality of groups, wherein all candidates from said fourth group comprise a second specified candidate trait, wherein said first specified candidate trait comprises a different candidate trait than said second specified candidate trait;

optimizing, by said optimization tool, said marketing events from said third group for all candidates from said fourth group; and sorting, by said optimization tool, said marketing events from said third group for all of said candidates from said fourth group.

23. The computer program product of claim 21, wherein said method further comprises generating by the optimization tool, a priority list comprising said sorted marketing events from said first group, and wherein said priority list prioritizes an order in which to offer each of said marketing events from said first group to all of said candidates from said second group.

24. The computer program product of claim 21, wherein said method further comprises generating by the optimization tool, a priority list comprising a first set of marketing events from said sorted marketing events from said first group that fall within a specified set of constraints, and wherein said priority list is for prioritizing an order in which to offer each of said marketing events from said first group to all of said candidates from said second group.

25. The computer program product of claim 24 wherein said specified set of constraints comprise timing conflicts related to offering all of said marketing events within said first group.

26. The computer program product of claim 24, wherein said specified set of constraints comprise budget constraints related to offering all of said marketing events within said first group.

27. The computer program product of claim 21, wherein said list of candidates comprises existing customers of an entity that is offering said plurality of marketing events.

28. The computer program product of claim 21, wherein said marketing events from said first group are sorted and optimized essentially simultaneously.

29. The computer program product of claim 21, wherein each marketing offer is selected from the group consisting of a product offer and a service offer.

30. The computer program product of claim 21, wherein each identified channel means is selected from the group consisting of a telephone call, an email, a text message, and standard mail.

31. The method of claim 11, further comprising:

removing, by said optimization tool from said third list, a third marketing event of said first group; and reallocating, by said optimization tool, monetary funds associated with said third marketing event to a fourth market event of said first group.

* * * * *